(No Model.)
B. I. PRICE.
TEMPLE FOR SPECTACLE FRAMES.
No. 444,505.　　　　　　　　Patented Jan. 13, 1891.
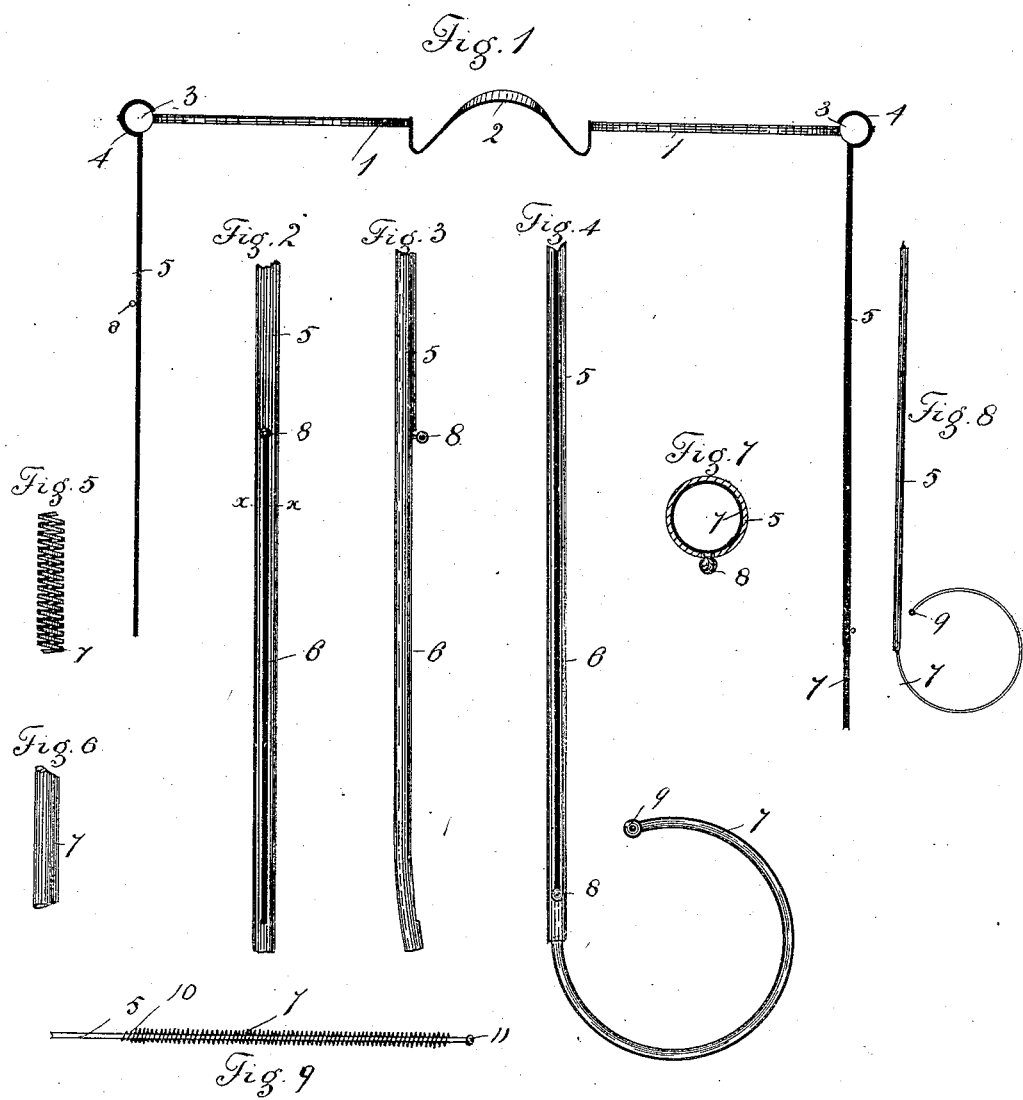

UNITED STATES PATENT OFFICE.

BENJAMIN I. PRICE, OF DENVER, COLORADO.

TEMPLE FOR SPECTACLE-FRAMES.

SPECIFICATION forming part of Letters Patent No. 444,505, dated January 13, 1891.

Application filed March 8, 1890. Serial No. 343,183. (No model.)

*To all whom it may concern:*

Be it known that I, BENJAMIN I. PRICE, a citizen of the United States, residing at Denver, in the county of Arapahoe and State of Colorado, have invented certain new and useful Improvements in Temples for Spectacle-Frames; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in temples for spectacle-frames; and the object of my invention is to provide a temple of the class stated consisting of two parts—namely, a stationary bar or straight temple suitably connected with the bow and an adjustable sliding part attached to the stationary bar and telescoping therein or sliding thereon and forming a riding temple, said device consisting of a combined straight and riding temple, being of simple construction, economical in cost, easily operated, reliable in action, and durable in use, to which ends my invention consists of the features hereinafter described and claimed.

In the drawings is illustrated an embodiment of my invention, in which drawings—

Figure 1 is a top or plan view of a pair of spectacles provided with my improvement. Fig. 2 is an enlarged side view or elevation of a part of a temple provided with my improvement, the adjustable part or riding temple being concealed within the stationary tubular bar or straight temple. Fig. 3 is a top view of the same. Fig. 4 is a side view showing the adjustable riding temple extended. Figs. 5 and 6 are enlarged views of two kinds of material, either of which may be used in forming the adjustable or riding temple of my improved device. Fig. 7 is a cross-section of the temple, taken on the line x x, Fig. 2, looking toward the right. Fig. 8 is a side elevation of the temple on the right of Fig. 1 or of the portion of Fig. 1 adjacent to Fig. 8. Fig. 9 shows the adjustable riding temple adapted to slide on the outside of the stationary bar forming the straight temple.

In the views, let the reference-numerals 1 1 designate the bows of a pair of spectacles; 3, a cylindrical bearing made fast to the outer end of each bow, and 4 the extremity of the temple, forming a joint with a cylindrical bearing at the end of the bow.

The reference-numeral 5 designates a stationary bar forming the straight temple. The inner part of bar 5 or the part secured to the bow is solid and the outer part tubular and provided with a slot 6 cut through its shell.

The solid and tubular portions of the temple, as shown in the drawings, form a continuous or integral part of sufficient length to answer the purpose of the ordinary straight or approximately straight temple.

My improvement consists in forming the outer portion of the bar 5 tubular for a distance from its free extremity equal to the length of the riding portion 7, which slides within this tubular portion of the bar. Part 7 when extended from the temple is adapted to turn downward behind the ears (hence the term "riding temple") for the purpose of holding the spectacles more securely upon the wearer. The natural position of the part 7 when extended and not in use is that shown in Figs. 4 and 8, said part, however, being sufficiently pliable or yielding to conform to the shape or contour of the back of the ear, the metal fabric of which it is composed being sufficiently delicate and soft to give ease and comfort to the wearer, and at the same time performing its function of retaining the spectacles in place.

Part 7 may consist either of a spiral spring, as shown in Fig. 5, or a solid portion, as shown in Fig. 6, and whether spiral or solid may be secured within the tubular portion of the temple heretofore described. A small knob 8 is secured to the inner extremity of the part 7 and extends through the slot 6. By means of this knob the part 7 is readily adjusted to any position desired, the knob being of sufficient size to be grasped by the fingers, and part 7 by its use extended from or drawn entirely within the tubular portion of the temple. The extremities of the slot limit the movement in either direction of the knob.

The reference-numeral 9 designates a small knob on the outer extremity of the part 7, giving it a smooth enlargement for engaging the back of the ear without injury to the head.

Instead of telescoping within the temple, the part 7 may surround the temple and slide on the outside thereof, as shown in Fig. 9, part 7 sliding over a knob 11 on the outer extremity of the temple, the outer extremity of the spring being sufficiently large to permit of this, while the inner extremity is sufficiently small, as shown at 10 to prevent this extremity from slipping over the knob 11 of the temple. By this means the spring is retained upon the temple.

Having thus described my invention, what I claim is—

In a combined straight and riding temple for spectacle-frames, a bar 5, forming the straight part of the temple and having a tubular outer portion for the reception of the riding part, said tubular portion being furnished with a slot 6, a part 7, forming the riding portion of the temple and provided with a knob 8, secured to the inner extremity and having a neck sliding within the slot during adjustment, part 7 being capable of being concealed entirely within the tubular portion of bar 5, and also capable of extension from said bar, so as to engage the back portion of the ear, substantially as described.

In testimony whereof I affix my signature in presence of two witnesses.

BENJAMIN I. PRICE.

Witnesses:
WM. MCCONNELL,
FRED. W. FELDWISCH.